(12) United States Patent
Rajan et al.

(10) Patent No.: US 8,252,185 B2
(45) Date of Patent: Aug. 28, 2012

(54) WATER TREATMENT APPARATUS AND METHOD

(75) Inventors: Rajan G. Rajan, Bensalem, PA (US); Mathu G. Rajan, Bensalem, PA (US)

(73) Assignee: Zero Technologies, Inc., Bensalem, PA (US)

( * ) Notice: Subject to any disclaimer, the term of this patent is extended or adjusted under 35 U.S.C. 154(b) by 715 days.

(21) Appl. No.: 12/193,137

(22) Filed: Aug. 18, 2008

(65) Prior Publication Data

US 2008/0302714 A1 Dec. 11, 2008

Related U.S. Application Data

(60) Continuation of application No. 11/847,015, filed on Aug. 29, 2007, now Pat. No. 7,413,663, and a division of application No. 10/408,658, filed on Apr. 8, 2003, now Pat. No. 7,276,161, and a continuation of application No. 09/951,479, filed on Sep. 14, 2001, now Pat. No. 6,572,769, and a continuation of application No. 08/867,910, filed on Jun. 3, 1997, now abandoned, and a continuation-in-part of application No. 08/311,943, filed on Sep. 26, 1994, now Pat. No. 5,635,063.

(51) Int. Cl.
*B01D 15/00* (2006.01)

(52) U.S. Cl. ........ 210/660; 210/661; 210/673; 210/681; 210/682; 210/683; 210/684; 210/685; 210/688; 210/694; 210/262; 210/266; 210/282; 210/283; 210/284

(58) Field of Classification Search .................. 210/660, 210/661, 673, 681–685, 688, 694, 262, 266, 210/282, 283–284

See application file for complete search history.

(56) References Cited

U.S. PATENT DOCUMENTS

| | | | |
|---|---|---|---|
| 1,730,581 A | | 10/1929 | McMachen et al. |
| 2,087,442 A | | 7/1937 | Nack |
| 2,334,802 A | | 11/1943 | Zuckermann |
| 3,250,703 A | | 5/1966 | Levendusky |
| 3,319,791 A | | 5/1967 | Horne |
| 3,342,340 A | | 9/1967 | Shindell |
| 3,621,851 A | * | 11/1971 | Heskett .................. 131/339 |
| 4,025,426 A | | 5/1977 | Anderson et al. |
| 4,198,296 A | | 4/1980 | Doumas et al. |

(Continued)

OTHER PUBLICATIONS

"U.S. Standard Sieve Series," www.wirecloth.com/howto/convert/ussieve.html downloaded Oct. 3, 2011 (first publication date unknown).*

*Primary Examiner* — Chester Barry
(74) *Attorney, Agent, or Firm* — J.A. Lindeman & Co., PLLC

(57) ABSTRACT

A water treatment apparatus includes a housing comprising multiple housing portions and a plurality of treatment sections disposed within the housing, each treatment section comprising at least one distinct particulate layer. The apparatus is designed so that no water pressure need be applied to force the water through the apparatus, as gravity pulls the water down through the filtering layers. Water may also be force fed through the treatment apparatus; when the water is force fed, the housing portions need not be vertically stacked, but may be configured in any suitable arrangement. The treatment sections are distributed through the various housing portions in logical groups to perform various kinds of filtering. The housing portions are detachable and sealably stackable in multiple configurations, thus passing water through more or fewer treatment layers, depending on the quality of the incoming water.

27 Claims, 8 Drawing Sheets

U.S. PATENT DOCUMENTS

| | | | |
|---|---|---|---|
| 4,264,451 A | 4/1981 | Pope et al. | |
| 260,106 A | 7/1982 | Long | |
| 4,368,123 A | 1/1983 | Stanley | |
| 4,382,862 A | 5/1983 | Dillman | |
| 4,430,226 A | 2/1984 | Hegde et al. | |
| 4,606,823 A | 8/1986 | Lucas, III | |
| 4,749,481 A | 6/1988 | Wheatley | |
| 4,769,143 A | 9/1988 | Deutsch et al. | |
| 4,800,018 A | 1/1989 | Moser | |
| 4,855,046 A | 8/1989 | Meehan | |
| 4,894,154 A | 1/1990 | Roz et al. | |
| 4,904,382 A | 2/1990 | Thomsen | |
| 4,944,875 A | 7/1990 | Gaignet | |
| 4,988,448 A * | 1/1991 | Woog | 210/665 |
| 4,995,976 A | 2/1991 | Vermes et al. | |
| 4,999,109 A | 3/1991 | Sabre | |
| 5,059,317 A | 10/1991 | Marius et al. | |
| 5,061,367 A | 10/1991 | Hatch et al. | |
| 5,064,534 A | 11/1991 | Busch et al. | |
| 5,078,874 A | 1/1992 | Sullivan | |
| 5,106,501 A | 4/1992 | Yang et al. | |
| 5,110,479 A | 5/1992 | Frommer et al. | |
| 5,126,044 A | 6/1992 | Magnusson et al. | |
| 5,149,437 A | 9/1992 | Wilkinson et al. | |
| 5,190,643 A | 3/1993 | Duncan et al. | |
| 5,205,932 A * | 4/1993 | Solomon et al. | 210/264 |
| 5,211,851 A | 5/1993 | Meurer | |
| 5,211,973 A | 5/1993 | Nohren, Jr. | |
| 5,215,657 A | 6/1993 | Goldfield et al. | |
| 5,240,620 A | 8/1993 | Shalev | |
| 5,269,919 A | 12/1993 | Von Medlin | |
| 5,271,837 A | 12/1993 | Discepolo et al. | |
| 5,273,649 A | 12/1993 | Magnusson et al. | |
| 5,275,737 A | 1/1994 | Heskett | |
| 5,308,482 A | 5/1994 | Mead | |
| 5,338,458 A | 8/1994 | Carrubba et al. | |
| 5,378,370 A * | 1/1995 | Brane et al. | 210/678 |
| 5,399,260 A | 3/1995 | Eldredge et al. | |
| 5,401,399 A | 3/1995 | Magnusson et al. | |
| 5,405,526 A | 4/1995 | Sutera | |
| 5,407,573 A | 4/1995 | Hughes | |
| 5,415,770 A | 5/1995 | Heskett | |
| 5,427,683 A | 6/1995 | Gershon et al. | |
| 5,569,380 A | 10/1996 | Sullivan | |
| 5,635,063 A | 6/1997 | Rajan et al. | |
| 5,707,514 A | 1/1998 | Yamasaki et al. | |
| 5,830,360 A | 11/1998 | Mozayeni | |
| 6,572,769 B2 | 6/2003 | Rajan et al. | |
| 7,276,161 B2 | 10/2007 | Rajan et al. | |

* cited by examiner

WATER TREATMENT APPARATUS AND METHOD

CROSS-REFERENCE TO RELATED APPLICATIONS

This application is continuation of U.S. patent application Ser. No. 11/847,015, filed Aug. 29, 2007, which is a divisional of U.S. patent application Ser. No. 10/408,658, filed Apr. 8, 2003, now U.S. Pat. No. 7,276,161, which is a continuation of U.S. patent application Ser. No. 09/951,479, filed Sep. 14, 2001, now U.S. Pat. No. 6,572,769, which is a continuation of U.S. patent application Ser. No. 08/867,910, filed Jun. 3, 1997, abandoned, which is a continuation-in-part of U.S. patent application Ser. No. 08/311,943, filed Sep. 26, 1994, now U.S. Pat. No. 5,635,063, the disclosures of which are incorporated herein by reference.

BACKGROUND OF THE INVENTION

1. Field of the Invention

The present invention relates to a water treatment apparatus. More particularly, the present invention relates to a multi-stage water treatment apparatus. Even more particularly, the present invention relates to a multi-stage water treatment apparatus for producing portable water.

2. Discussion of the Related Art

As disclosed in the above referred to co-pending application, a need exists for water treatment systems that remove organic, inorganic, radiological, and microbiological contaminants from water, thereby rendering the water suitable for human consumption. The co-pending application teaches a water treatment apparatus that removes these contaminants by passing the water through a housing comprising two chambers, each of which contains a plurality of layers of treatment materials; these treatment materials include silver impregnated activated carbon, activated carbon, iodine resin, and a mixed bed of cationic and anionic resins. While the water treatment apparatus of the co-pending application is efficacious, further experimentation has revealed that its usefulness may be improved by adding more and different layers of treatment material in different configurations, and by enabling continuous, as well as batch, filtration.

SUMMARY OF THE INVENTION

The present invention provides a water treatment apparatus which removes a broad range of contaminants and which may be gravity fed or pressure fed. The water to be treated may be derived from any source, including ponds, lakes, condensation such as that from an air conditioner, etc.

The apparatus hereof, generally, comprises:

(a) a first housing portion comprising:
(i) a top surface, the top surface having a water inlet formed therein;
(ii) a cylindrical sidewall integrally formed with the top surface and depending therefrom;
(iii) a bottom surface integral with the sidewall and extending therefrom, the bottom surface having a recess formed therein, the recess having a plurality of holes formed therein, the holes defining means for providing a long dwell time;

(b) a second housing portion comprising:
a cylindrical side wall having an upper edge and terminating at a housing outlet;

(c) means for detachably connecting the first housing portion and the second housing portion such that the recess of the first housing portion is housed within the second housing portion;

(d) at least one treatment section disposed within the first housing portion;

(e) at least one treatment section disposed within the second housing portion;

(f) at least one porous separator disposed in each housing portion, the at least one porous separator removing impurities from water and regulating water flow through each of the treatment sections; and wherein water flows into the water inlet, through each of the treatment sections in at least one of the housing portions, through the at least one porous separator, and exits at the housing outlet.

The claimed invention presents a water treatment apparatus that removes organic, inorganic, radiological, and microbiological contaminants from water.

In a first embodiment hereof, in order to ensure complete treatment of the water fed into the system, the water treatment apparatus includes a plurality of housing portions, ranging from at least two up to about six housing portions, that are sealably, removably connected, the housing portions being separable depending on the quality of the incoming water. Disposed within each housing portion is at least one treatment section. In a two-housing portion array, preferably, a first housing portion includes a "Halogen Removal and pH Neutralization Section" and a "Microbiological Treatment Section," and a second housing portion includes an "Iodine Removal Section" and an "Organic, Inorganic, and Radiological Removal Section." The first housing portion is separable from the second portion and, depending on the quality of the water to be treated, may be bypassed, thereby passing water through only the second housing portion, if there are few enough contaminants in water entering the system that the treatments of the first and second sections are not needed.

In a six-housing portion array, preferably, a first housing portion includes a "Pretreatment Section"; a second housing portion includes a "Microbiological Treatment Section"; a third housing portion includes an "Iodine Dwell Section"; a fourth housing portion includes an "Iodine Removal Section"; a fifth housing portion includes a "pH Neutralization and Organic Removal Section"; and a sixth housing portion includes an "Inorganic and Radiological Removal Section." The housing portions are all separable from each other and, depending on the quality of the water to be treated, any may be bypassed, thereby passing water through only the remaining housing portions, if there are few enough contaminants in water entering the system that the treatments of various sections are not needed.

The source of water may be a water supply tank which gravity feeds the apparatus hereof. Alternatively, a forcing means such as a pump or a faucet attachment with a flow regulator may be used to force water through the treatment sections. Water is fed into the forcing means by a connection to any source of water, including a condenser of an air conditioner, a vehicle radiator, a natural source such as a lake or pond, brackish water, etc. The forcing means forces water from the water source through the treatment housings, where treatment occurs as described hereinabove.

In a second embodiment hereof, the housing portions are separate and distinct and are interconnected by fluid delivery conduits. In this embodiment, the water to be treated is forced through the system by forcing means, such as a pump, a faucet attachment with a flow regulator, or the like. As in the first embodiment, water is fed into the forcing means by a connection to any source of water, including a condenser of an air conditioner, a vehicle radiator, a natural source such as a lake or pond, brackish water, etc. The forcing means forces water from the water source through the treatment housings, where treatment occurs as described hereinabove.

In each embodiment, water flows into the treatment housing through the housing inlet, passes through the water treatment media, the filtering media, and the water flow control media, eventually passing out of the housing via the housing outlet.

The present invention will be more clearly understood with reference to the accompanying drawings. Throughout the figures, like reference numerals refer to like parts in which:

DETAILED DESCRIPTION OF THE PREFERRED EMBODIMENT

Figure 1:
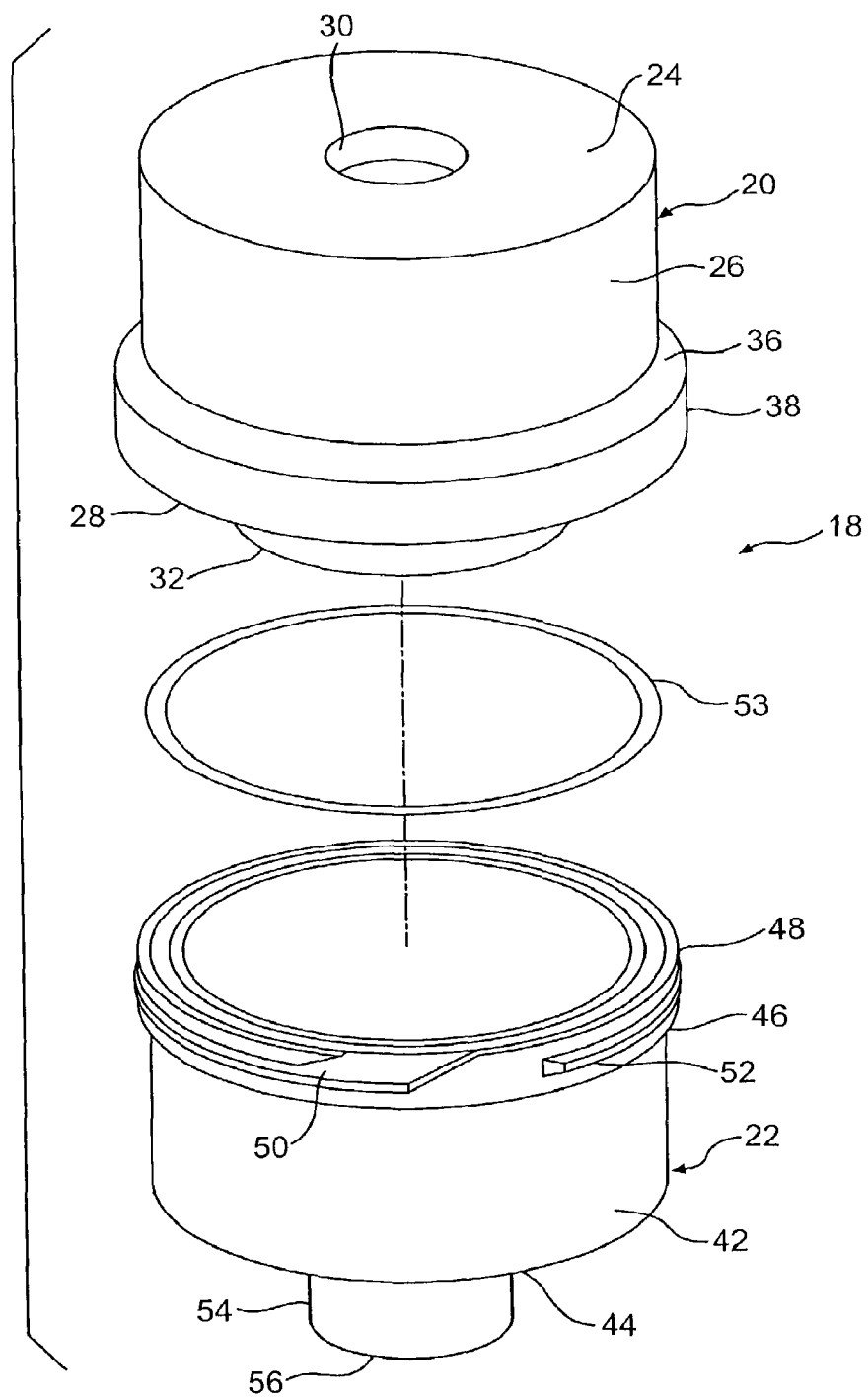
FIG. 1 is an exploded view of a water treatment apparatus in accord with a first embodiment of the present invention.
Figure 2:
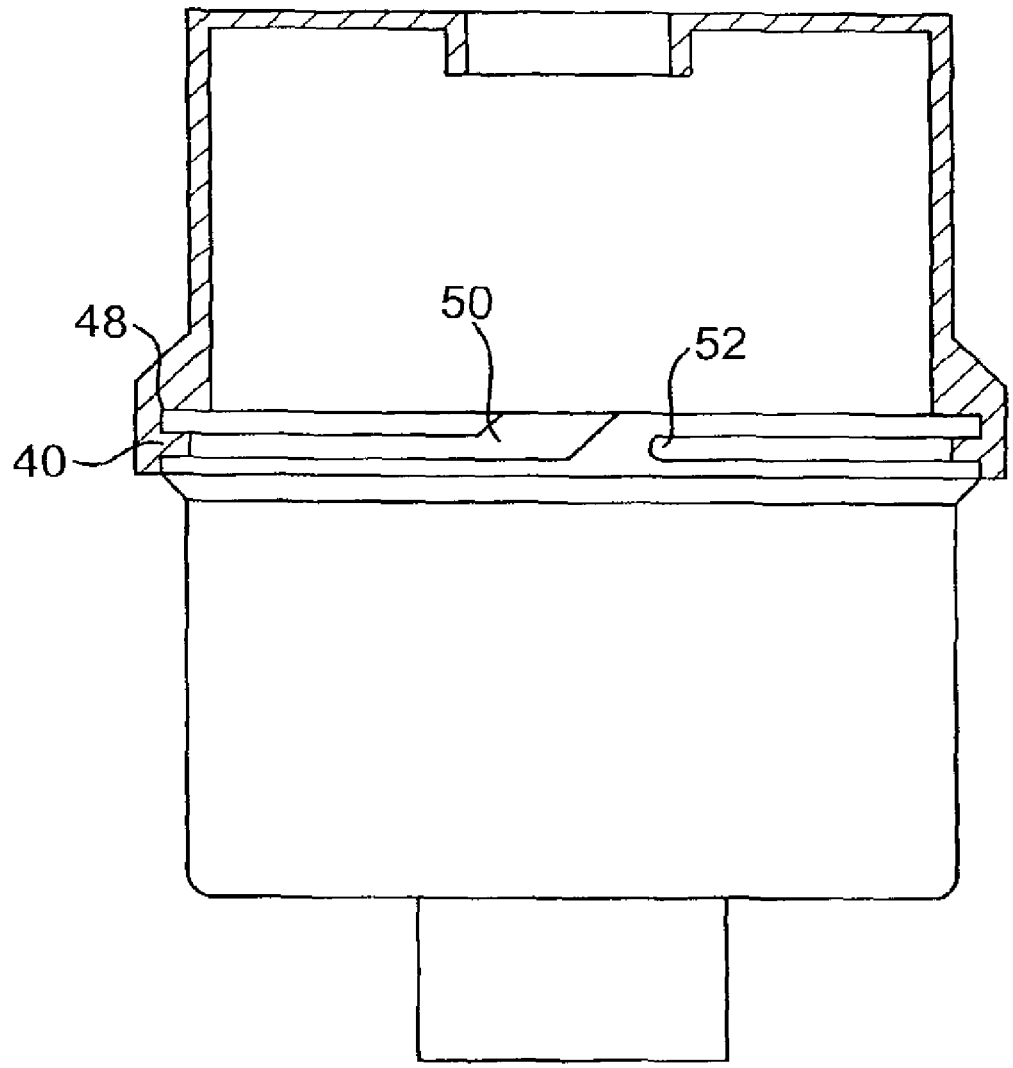
FIG. 2 is a side view of a second housing portion of the first embodiment of the water treatment apparatus hereof.

Referring now to FIGS. 1 and 2, and as disclosed and shown in the co-pending application, there is depicted therein a first embodiment of the present invention generally, depicted at 12, which functions in conjunction with a water supply tank 14 and a water collection tank 16.

The water treatment apparatus 12 includes a generally cylindrical housing 18. The housing, preferably, comprises a first generally cylindrical housing portion 20 and a second generally cylindrical housing portion 22. Both housing portions are formed from water impermeable material, and are constructed as disclosed in the co-pending application. The housing portions 20, 22 are removably sealably interconnected, as disclosed in the co-pending application.

Disposed within each of the housing portions 20, 22 is at least one and, preferably, a plurality of treatment sections, each treatment section comprising at least one discrete particulate layer. The treatment sections cooperate to help rid water of impurities such as bacteria, heavy metals, chlorine, etc. At least one of the treatment sections in the second housing member defines means for removing organic, inorganic, and radiological contaminants. The specific constituents of the treatment sections, their functions, and their relative positioning within the housing 18 will be discussed further.

Figure 3:
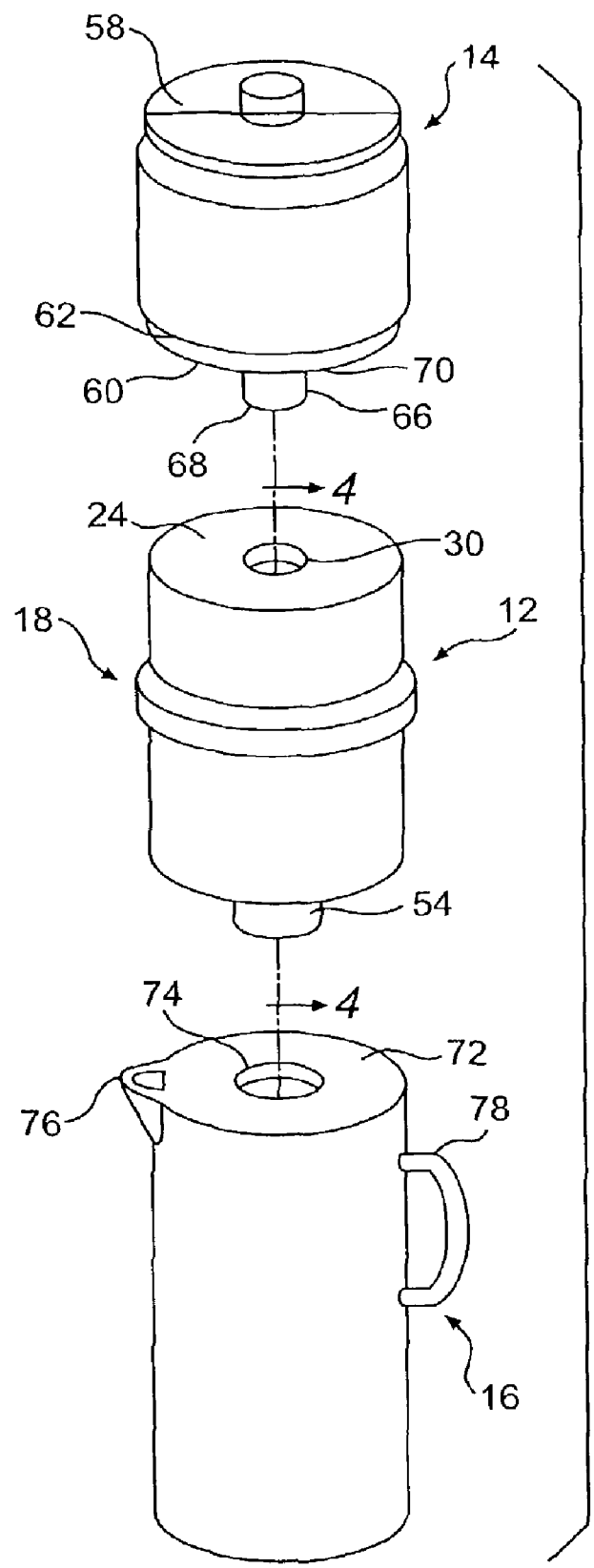
FIG. 3 is an environmental view of the first embodiment of the water treatment apparatus hereof.

As shown in FIG. 3, the water supply tank 14 seats atop the top surface 24 of the housing 18 and the water collection tank seats below the housing 18. These are attached and cooperate as disclosed in the co-pending application. Water flows from the water supply tank 14 through the water treatment apparatus 12 and is collected in the water collection tank 16.

Figure 4:
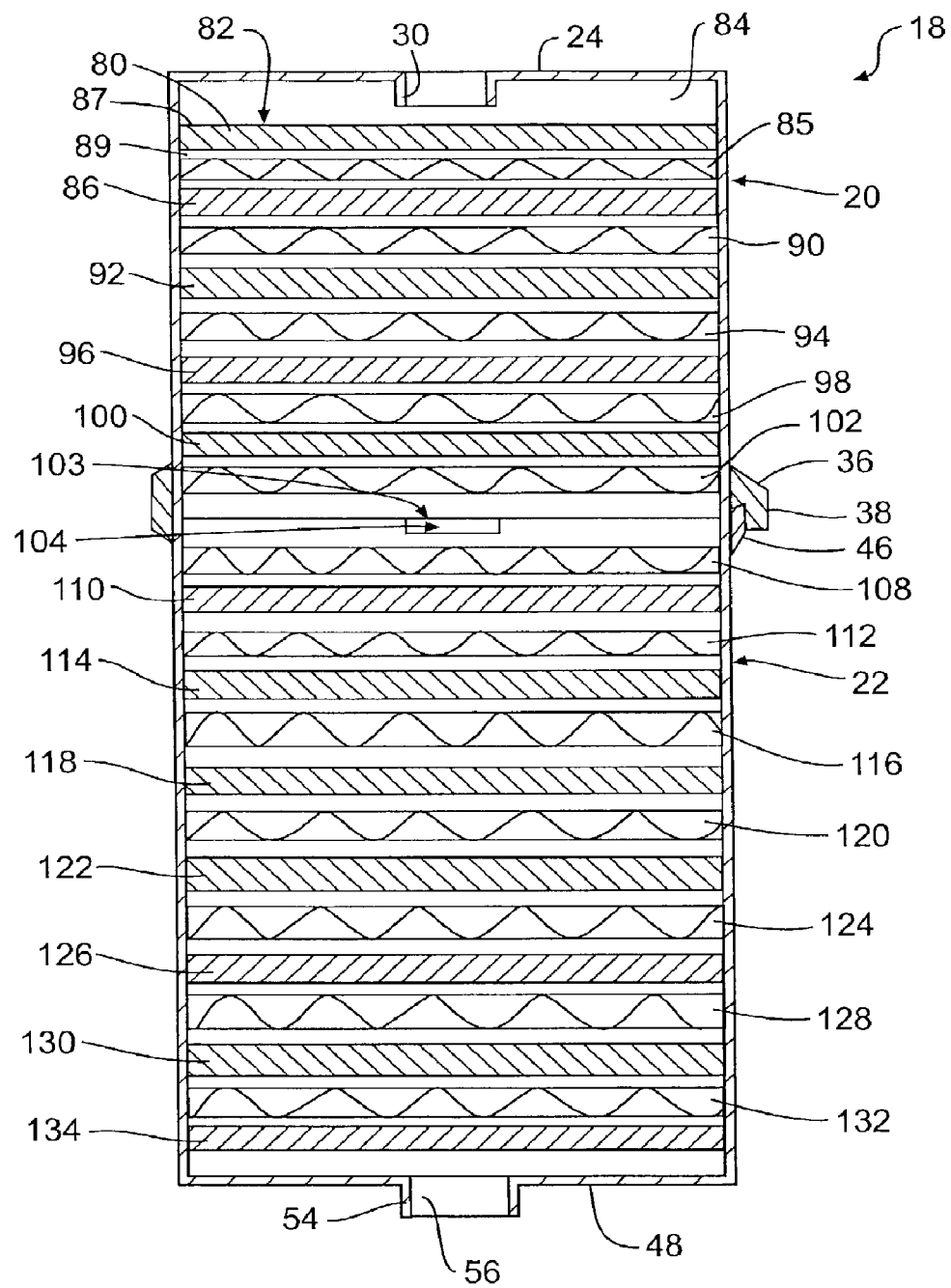
FIG. 4 is a cross-sectional view of the water treatment apparatus taken along line 4-4 of FIG. 3.

FIG. 4 depicts the various distinct treatment sections within the housing 18 of the water treatment apparatus 12, and the particulate layers that form the treatment sections. Each of the layers has a diameter substantially equal to the diameter of the housing, ensuring that water flows through each of the layers and does not leak in any space between the housing and the respective layer. The first housing portion 20 of the housing 18, which serves as the top of the housing 18, includes a topmost layer comprising a separator member, such as a plastic disk 80 having a multiplicity of holes 82 formed therethrough. The holes are evenly distributed on the disk and control the flow of water through the apparatus 12. The disk 80 functions to disperse water flowing in through the housing inlet 30 and to reduce the flow rate of the water through the treatment apparatus 12. The disk 80 is seated between two radially inwardly directed shoulders 87, 89 which hold the disk 80 in place. The disk 60 has a diameter substantially equal to that of the first housing portion 20, ensuring that water flows through the plurality of holes 82 formed through the disk 80. It is vital to the function of the water treatment apparatus 12 that water flowing through each of the layers is dispersed and permeates throughout each layer. This helps to increase the life of the water treatment apparatus, generally, by causing water to flow throughout each layer, instead of forming channels within each layer, reducing the life of an individual layer and, thusly, the line of the water treatment apparatus.

The plastic disk 80 is located a distance from the top surface 24 of the first housing member 20. This provides a small reservoir area 84 within the first housing member for holding water received through the housing inlet 30 and helps prevent water from backing up into the water supply tank 14.

Disposed below the plastic disk 80 is a first treatment section which is, preferably, a "Halogen Removal and pH Neutralization Section." The first treatment section has a first separator, preferably a first filter paper 85, and includes layers one through three as described hereinafter. The first filter paper 85 filters out and traps large impurities in the water. Additionally, the first filter paper 85 serves to help distribute the water within the first housing member 20, in the same manner as noted above. Any type of filter paper may be used herein and includes felt filter papers nylon filter paper, and other filter paper known to the skilled artisan. All of the filter paper referred to herein may be one of these types of filter paper. Additionally, each piece of filter paper serves to slow the progress of water through the water treatment apparatus 12 and has a diameter substantially equal to that of the housing ensuring water does not leak around the edges of the filter paper. Some pieces of filter paper may be thicker or thinner, depending upon the flow rate required to achieve sufficient contact time between the water and the discrete layer disposed above the filter paper.

Beneath the first filter paper 85 is a layer of silver impregnated, activated carbon (silver carbon) 86. The silver carbon 86 primarily serves to remove chlorine from water passing therethrough. The silver blocks the growth of bacteria within the activated carbon layer 86. If bacteria were to grow in the activated carbon layer 86, the water treatment apparatus 12 would function inefficiently. Silver carbon is a well-known and commercially available product, such as that sold by Bestech, Inc.

Beneath the silver carbon layer 86, a second filter paper 90 is disposed which aids in distributing water flow and filters out any silver or carbon particulates which become entrained in the water. As shown, a layer of activated carbon 92 is disposed below the second filter paper 90. This layer filters out any remaining chlorine in the water. The activated carbon layer 92 also removes any chloromethane that might be present, which is a source or unpleasant odor in water. Activated carbon is, also, a commercially available product, such as that sold by the Calgon Carbon Corporation. The carbon further serves to protect the silver carbon 86 from Redox Alloy in a later layer, as described hereinbelow. This protection is needed because Redox Alloy that comes in contact with silver carbon will strip silver from the silver carbon.

Below the layer of activated carbon 92 is disposed a third filter paper 94. The third filter paper 94 serves further to distribute water flow and to filter out any impurities that may have passed through the previous filter papers. Below the third filter paper 94 is a layer of Redox Alloy 96. Redox Alloy is a well-known and commercially available product; one example is KDF, which is manufactured by KDF Fluid Treatment. The Redox Alloy will kill any microbiological contaminants in the water. The layer 96 of Redox Alloy completes the first treatment section.

Disposed below the first treatment section, still within the first housing portion 20, is a second treatment section, a "Microbiological Treatment Section." The second treatment section starts with a fourth filter paper 98, and includes layers four and five as described hereinbelow. The fourth filter paper 98 serves further to distribute water flow and to filter out any impurities that may have passed through the previous filter papers. Below the fourth filter paper 98 is a layer of iodine particles or resin 100. The iodine particles or resin, which may be of the trivalent, pentavalent, or septavalent variety or a combination of these, serves to kill microbiological contaminants in the water, such as viruses and bacteria. Iodine particles or resin with an odd valence are used because the intramolecular bonds of such molecules are weaker than those of iodine molecules with an even valence, and the weaker bonds will allow the iodine to attack microorganisms more quickly. Odd-valence iodine is a well-known and commercially available product; one example is MCV resin, sold by Umpqua Research Company. A hybrid of odd-valence and even-valence iodine may also be used. Also, an optional second layer of iodine (not shown) may also be used.

Figure 5:
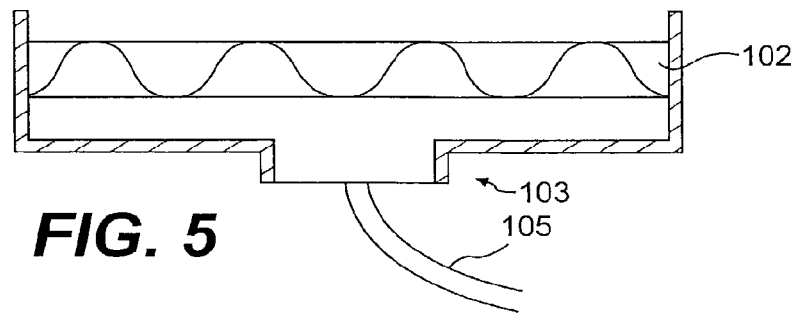
FIG. 5 is a cross-sectional view of a first means for lengthening dwell time used in the practice hereof.
Figure 6:
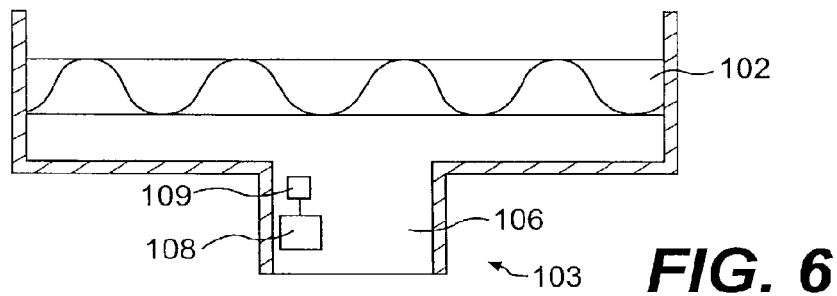
FIG. 6 is a cross-sectional view of a second means for lengthening dwell time used in the practice hereof.

Below the layer of iodine particles or resin 100 is disposed a fifth filter paper 102. The fifth filter paper 102 serves further to distribute water flow and to filter out any impurities that may have passed through the previous filter papers. Below the fifth filter paper 102 is disposed, as a fifth treatment layer, means for lengthening dwell time 103. The means for lengthening dwell time 103 may comprise any suitable construction for holding the water for an extended period of time. For example, the means 103 may comprise an elongated tube 105, as shown in FIG. 5, or a retention cup or tank 106, as shown in FIG. 6. The means for lengthening dwell time 103 may contain a layer of iodine particles or resin.

If the means for lengthening dwell time 103 contains a layer of iodine particles or resin, the means 103 should be sufficiently large to allow a dwell time of about 1 to 10 minutes before the water passes from the means 103 to the next layer, depending on the iodine concentration in the water. Adjusted iodine concentrations of less than 0.9 ppm should not be used.

If the means for lengthening dwell time 103 does not contain a layer of iodine particles or resin, the only iodine in the water is what is the water from the previous layer 100 brings with it. The means 103 should be sufficiently large to allow a dwell time of 8 to 10 minutes before the water passes from the means 103 to the next layer.

As shown in FIG. 6, at least one probe 108 may be used to measure the iodine concentration in the means for lengthening dwell time 103. A timer 109 in communication with the at least one probe 109 calculates the necessary dwell time by the formula "dwell time=60 minutes divided by ppm of iodine."

The means for lengthening dwell time 103 completes the second treatment section, and is the last treatment section in the first housing portion 20. As discussed hereinabove, the first housing portion 20 may be removed, thereby passing water through only the second housing portion 22, it there are few enough contaminants in water entering the system that the treatments in the first housing portion 20 are not needed.

Disposed below the second treatment portion, within the second housing portion 22, is a third treatment section, an "Iodine Removal Section." The third treatment section starts with a sixth filter paper 108 and includes layers six through eight, as described hereinafter. The sixth filter paper 108 serves further to distribute water flow and to filter out any impurities that may have passed through the previous filter papers. Below the sixth filter paper 102 is disposed a layer 110 of anionic resin in the chloride form. Anionic resin in the chloride form is a well-known and commercially available product; one example is Iodosorb II, sold by Umpqua Research Company. Anionic chloride removes iodine and iodide from the water.

Below the anionic resin 110 is disposed a seventh filter paper 112. The seventh filter paper 112 serves further to distribute water flow and to filter out any impurities that may have passed through the previous filter papers. Below the seventh filter paper 112 is disposed a layer of silver carbon 114. The silver carbon removes iodide from the water.

Below the silver carbon 114 is disposed an eighth filter paper 116. The eighth filter paper 116 serves further to distribute water flow and to filter out any impurities that may have passed through the previous filter papers. Below the eighth filter paper 116 is disposed a layer of activated carbon 118. The activated carbon removes iodine from the water.

The activated carbon 118 may have silver carbon admixed therewith. This is necessary if the water has high levels of microorganisms, to prevent microorganism growth from occurring on the activated carbon 118.

The layer of activated carbon 118 completes the third treatment section. Disposed below the third treatment section, still within the second housing portion 22, is a fourth treatment section, an "Organic, Inorganic, and Radiological Removal Section." The fourth treatment section starts with a ninth filter paper 120 and includes layers nine through fifteen, as described hereinafter. The ninth filter paper 120 serves further to distribute water flow and to filter out any impurities that may have passed through the previous filter papers. Below the ninth filter paper. 120 is disposed a layer of activated carbon 122. The activated carbon protects the anionic resin layer 110 and the silver carbon layer 114 from Redox Alloy in a later layer, as described hereinbelow. This protection is needed because Redox Alloy that comes in contact with the anionic resin layer 110 will strip chloride therefrom, and Redox Alloy that comes in contact with the silver carbon layer 114 will strip silver from the silver carbon. Alternately, the layer 122 may consist of a mixture of cationic resin in the hydrogen form and activated carbon. This latter mixture may also contain silver carbon.

Below the activated carbon 122 is disposed a tenth filter paper 124. The tenth filter paper 124 serves further to distribute water flow and to filter out any impurities that may have passed through the previous filter papers. Below the tenth filter paper 124 is disposed a layer 126 of Redox Alloy. The Redox Alloy removes inorganic contaminants from the water and neutralizes pH in the water. The pH neutralization is necessary for implementation of an ion exchange resin layer in a later step to work, as described hereinbelow. The Redox Alloy also kills any microbiological contaminants in the water, which may have been introduced by trace microbiological contaminants in the water growing on the layers of activated carbon 118 and 122. Activated carbon may also be admixed with the Redox Alloy in this layer.

Below the Redox Alloy 126 is disposed an eleventh filter paper 128. The eleventh filter paper 128 serves further to distribute water flow and to filter out any impurities that may have passed through the previous filter papers. Below the eleventh filter paper 128 is disposed a layer of activated carbon 130. The activated carbon protects the ion exchange resin in a later layer, as described hereinbelow, from the Redox Alloy 126; the activated carbon removes "glue taste," which might have been introduced into the water by the Redox Alloy 126, from the water; and the activated carbon removes organic contaminants from the water.

Below the activated carbon 130 is disposed a twelfth filter paper 132. The twelfth filter paper 132 serves further to distribute water flow and to filter out any impurities that may have passed through the previous filter papers. Below the twelfth filter paper 132 is disposed a layer of ion exchange resin 134. The ion exchange resin 134 is a mixed bed resin of cationic and anionic resins. The mixed bed resin is a well-known and commercially available product; one example is Nm60-SG, sold by Sybron Chemicals. The ion exchange resin 134 removes inorganic and radiological contaminants from the water.

If the water entering the system is hard, i.e. has high levels of Ca++, Mg++, etc., the mixed bed resin is mixed with activated carbon in the layer 134. If the water entering the system is very hard, i.e. has very high levels of Ca++, Mg++, etc., then a water softener layer is substituted for the ion exchange layer 134. Suitable water softeners are well-known and commercially available; one example is that sold under the designation C-249, by Sybron Chemicals. If the water entering the system is extremely hard, i.e. has extremely high levels of Ca++, Mg++, etc., the water softener is mixed with activated carbon in the layer 134. Water hardness is calculated by dividing the total dissolved solids (TDS) in ppm by 17.1; this calculation gives grains of hardness per gallon.

Figure 7:
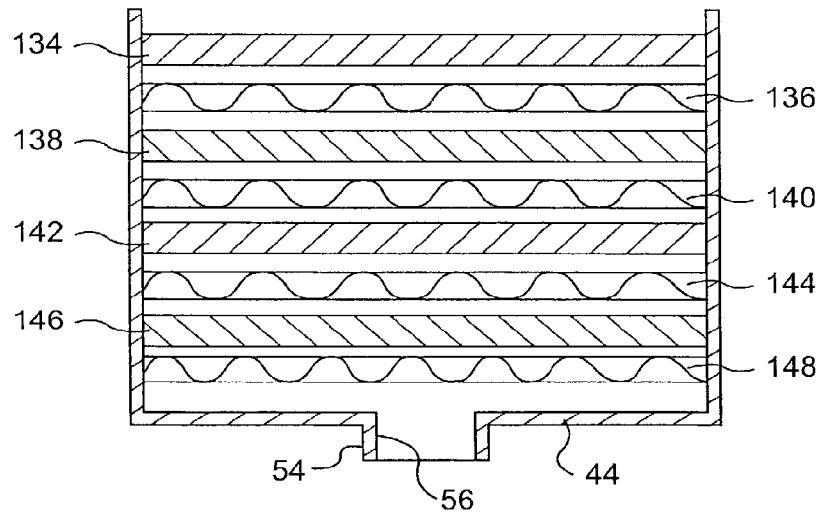
FIG. 7 is a cross-sectional view of a portion of a treatment housing of a water treatment apparatus in accord with the first embodiment of a water treatment apparatus.

Turning now to FIG. 7, if the water entering the system is very hard or extremely hard, and water softener with or without activated carbon is used as the layer 134 as described hereinabove, then below the layer 134 is disposed a thirteenth filter paper 136. The thirteenth filter paper 136 serves further to distribute water flow and to filter out any impurities that may have passed through the previous filter papers. Below the thirteenth filter paper 136 is disposed a layer of activated carbon 138. The activated carbon 138 protects the water softener in the layer 134 from Redox Alloy in a later layer, as described hereinbelow.

Disposed below the activated carbon 138 is a fourteenth filter paper 140. The fourteenth filter paper 140 serves further to distribute water flow and to filter out any impurities that may have passed through the previous filter papers. Below the fourteenth filter paper 140 is disposed a layer of Redox Alloy 142. The Redox Alloy removes inorganic contaminants from the water and neutralizes pH in the water. The pH neutralization is necessary for the water leaving the system to be portable. The Redox Alloy also kills any microbiological contaminants in the water, which may have been introduced by trace microbiological contaminants in the water growing on the layer of activated carbon 138.

Below the Redox Alloy 142 is disposed a fifteenth filter paper 144. The fifteenth filter paper 144 serves further to distribute water flow and to filter out any impurities that may have passed through the previous filter papers. Below the fifteenth filter paper 144 is disposed a layer of activated carbon 146. The activated carbon removes "glue taste," which might have been introduced into the water by the Redox Alloy 126, from the water.

The layer of activated carbon 146, or the ion exchange layer 134, if the incoming water is not hard enough to necessitate the thirteenth through fifteenth particulate layers, completes the fourth treatment section. Disposed below the fourth treatment section, still within the second housing portion 22, is a sixteenth filter paper 148. The sixteenth filter paper 148 serves further to distribute water flow and to filter out any impurities that may have passed through the previous filter papers. Below the sixteenth filter paper 148, water then flows from the water purification apparatus through the downwardly extending spout 56 into the water collection tank 16 through the aperture 74 in the top 72 of the water collection tank 16. A user may then remove the water collection tank 16 from the water purification apparatus and utilize the water collection tank 16 as a pitcher for pouring water into an appropriate drinking apparatus such as a glass or a mug.

Figure 8:
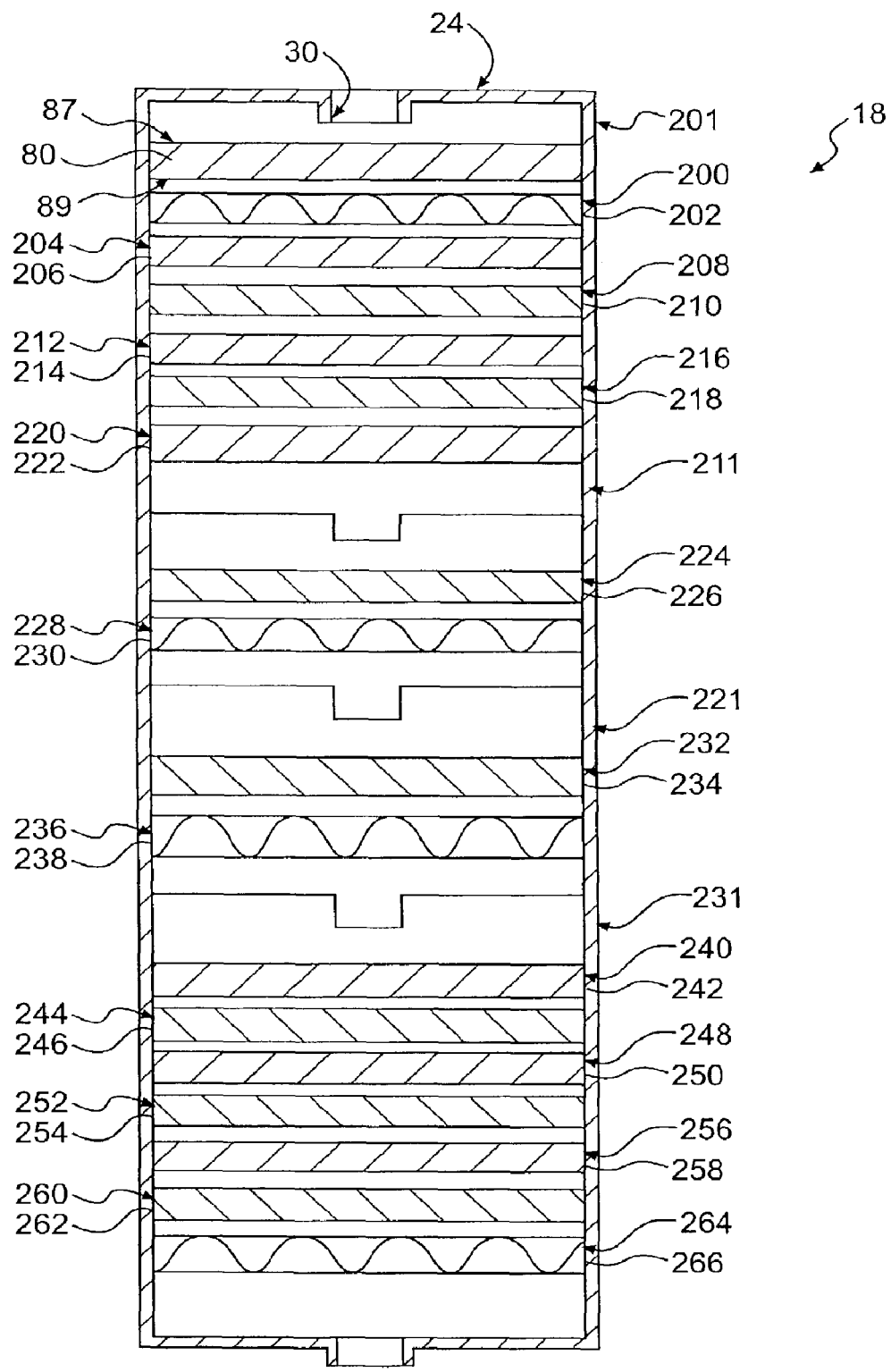
FIG. 8 is a cross-sectional view of the upper stacked housing portions of a water treatment apparatus in accord with the present invention.
Figure 9:
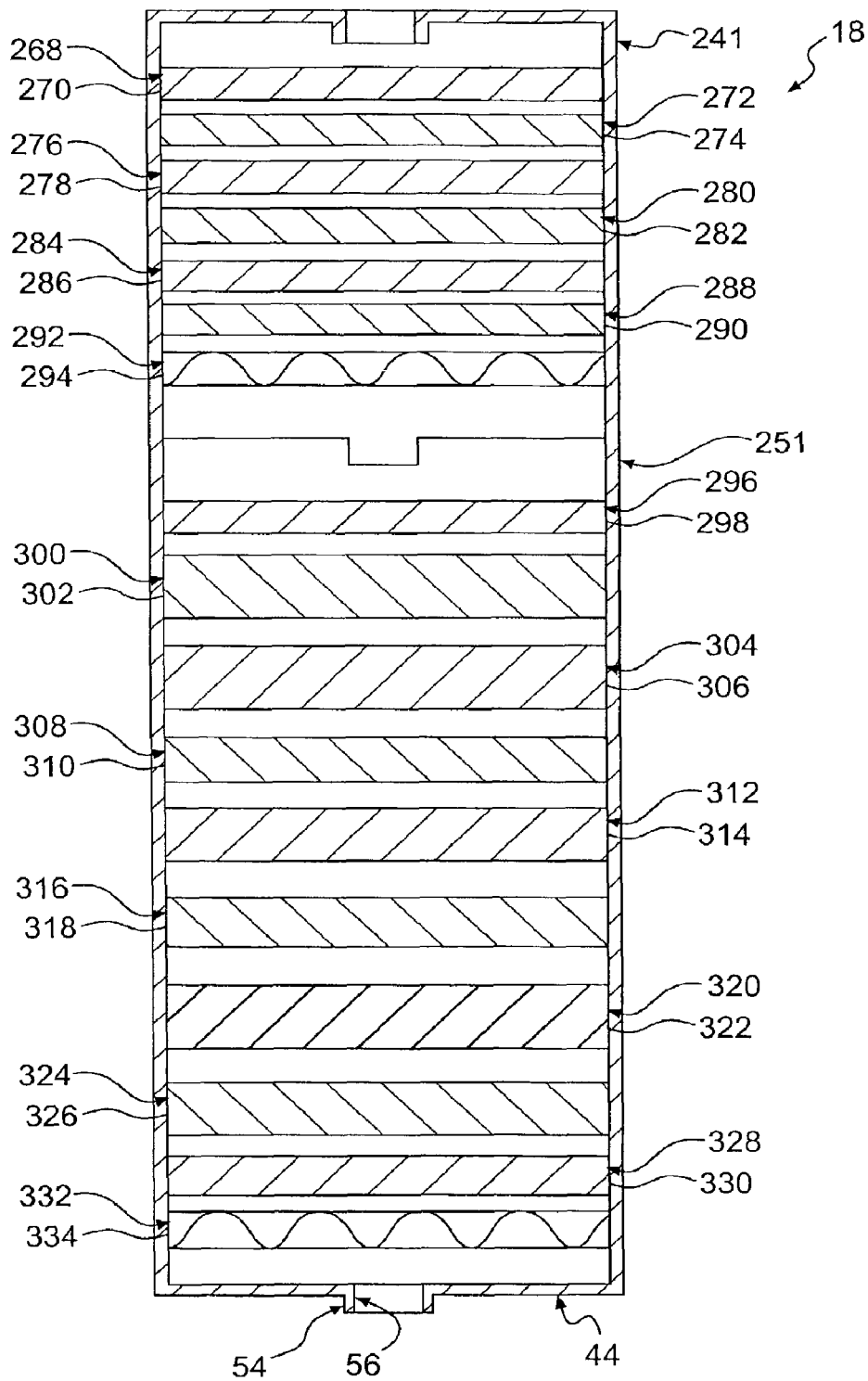
FIG. 9 is a cross-sectional view of the lower stacked housing portions of a water treatment apparatus in accord with the present invention.

It is to be appreciated that the construction hereof enables the "stacking" of housing portions to tailor the filtering to be effected. Thus, and turning now to FIGS. 8 and 9, there is shown this stacking of sections of treatment material, comprising more distinct particulate layers, disposed within the housing 18. As shown in FIGS. 8 and 9, the housing 18 comprises six housing portions 201, 211, 221, 231, 241, 251. The housing portions are shaped as are the housing portions in the first embodiment, each having a cylindrical sidewall defining a hollow interior. The housing portions are removably sealably interconnected to one another as described hereinabove. Each housing portion houses one treatment section. The treatment materials in the distinct particulate layers making up the treatment sections are the sane as the treatment materials in the embodiments described hereinabove, and their purposes are the same as those described hereinabove; therefore, in the interest of efficiency, only the composition of the various treatment sections and constituent particulate layers in the second embodiment, and not their purposes, will be discussed hereinbelow. The housing portions 201, 211, 221, 231, 241, 251 are separable and stackable in prescribed order as indicated above, thus passing incoming water through more or fewer treatment sections as necessary depending on the quality of the incoming water. As in the two housing portion array described hereinabove, a layer of filter paper is, preferably, disposed between every two adjacent layers of treatment material, though most of the filter papers may be dispensed with in a less-preferred embodiment. At a minimum, there should be one layer of filter paper per section, as described hereinbelow.

In a six-housing portion array, disposed below the plastic disk 80 in the first housing section 201 is a first treatment section, a "Pretreatment Section." The first treatment section starts with a first filtering layer 200, the first filtering layer 200 containing filter paper 202.

Below the first layer 200 is a first treatment layer 204, the first treatment layer 204 containing silver carbon 206.

Below the first treatment layer 204 is a second treatment layer 208, the second treatment layer 208 containing activated carbon 210.

Below the second treatment layer 208 is a third treatment layer 212, the third treatment layer 212 containing a combination of silver carbon and activated carbon 214.

Below the third treatment layer 212 is a fourth treatment layer 216, the fourth treatment layer 216 containing Redox Alloy 218.

Below the fourth treatment layer 216 is a fifth treatment layer 220, the fifth treatment layer 220 containing a combination of Redox Alloy and activated carbon 222. The fifth treatment layer completes the first treatment section.

Below the first treatment section is a second treatment section, a "Microbiological Treatment Section." The second treatment section is housed within the second housing portion 211. The second treatment section starts with a sixth treatment layer 224, the sixth treatment layer 224 containing iodine articles or resin 226, the iodine particles or resin 226 being in the trivalent, pentavalent, or septavalent form or a combination of these. A hybrid of odd-valence and even-valence iodine may also be used. Also, an optional second layer of iodine (not shown) may also be used.

Below the sixth treatment layer 224 is a second filtering layer 228, the second filtering layer 229 containing filter paper 230. The second filtering Layer completes the second treatment section.

Below the second treatment section is a third treatment section, an "Iodine Dwell Section." The third treatment section is housed within the third housing portion 221. The third treatment section starts with a seventh treatment layer 232, the seventh treatment layer 232 containing means for lengthening dwell time 234, as described hereinabove and shown in FIG. 5 or 6.

Below the seventh treatment layer 232 is a third filtering layer 236, the third filtering layer 236 containing filter paper 238. The third filtering layer completes the third treatment section.

Below the third treatment section is a fourth treatment section, an "Iodine Removal Section." The fourth treatment section is housed within the fourth housing portion 231. The fourth treatment section starts with an eighth treatment layer 240, the eighth treatment layer 240 containing anionic resin 242.

Below the eighth treatment layer 240 is a ninth treatment layer 244, the ninth treatment layer 244 containing silver carbon 246.

Below the ninth treatment layer 244 is a tenth treatment layer 248, the tenth treatment layer 248 containing activated carbon 250.

Below the tenth treatment layer 248 is an eleventh treatment layer 252, the eleventh treatment layer 252 containing a combination of silver carbon and activated carbon 254.

Below the eleventh treatment layer 252 is a twelfth treatment layer 256, the twelfth treatment layer 256 containing a combination of activated carbon and anionic resin 258.

Below the twelfth treatment layer 256 is a thirteenth treatment layer 260, the thirteenth treatment layer 260 containing anionic resin followed by a combination of silver carbon and activated carbon 262.

Below the thirteenth treatment layer 260 is a fourth filtering layer 264, the fourth filtering layer 264 containing filter paper 266. The fourth filtering layer completes the fourth treatment section.

Below the fourth treatment section is a fifth treatment section, a "pH Neutralization and Organic Removal Section." The fifth treatment section is housed within the fifth housing portion 241. The fifth treatment section starts with a fourteenth treatment layer 268, the fourteenth treatment layer 268 containing Redox Alloy 270. Alternately, the fifth treatment section may start with a layer of activated carbon (not shown) preceding the fourteenth treatment layer 268 containing Redox Alloy 270. Also, activated carbon may be admixed with the Redox Alloy in this layer.

Below the fourteenth treatment layer 268 is a fifteenth treatment layer 272, the fifteenth treatment layer 272 containing activated carbon 274.

Below the fifteenth treatment layer 272 is a sixteenth treatment layer 276, the sixteenth treatment layer 276 containing silver carbon 278.

Below the sixteenth treatment layer 276 is a seventeenth treatment layer 280, the seventeenth treatment layer 280 containing a combination of Redox Alloy and activated carbon 282.

Below the seventeenth treatment layer 280 is an eighteenth treatment layer 294, the eighteenth treatment layer 284 containing a combination of silver carbon and activated carbon 286.

Below the eighteenth treatment layer 284 is a nineteenth treatment layer 288, the nineteenth treatment layer 288 containing Redox Alloy followed by a combination of silver carbon and activated carbon 290.

Below the nineteenth treatment layer 288 is a fifth filtering layer 292, the fifth filtering layer 292 containing filter paper 294. The fifth filtering layer completes the fifth treatment section.

Below the fifth treatment section is a sixth treatment section, an "Inorganic and Radiological Removal Section." The sixth treatment section is housed within the sixth housing portion 251. The sixth treatment section starts with a twentieth treatment layer 296, the twentieth treatment layer 296 containing mixed bed resin 298.

Below the twentieth treatment layer 296 is a twenty-first treatment layer 300, the twenty-first treatment layer 300 containing water softener 302.

Below the twenty-first treatment layer 300 is a twenty-second treatment layer 304, the twenty-second treatment layer 304 containing Redox Alloy 306.

Below the twenty-second treatment layer 304 is a twenty-third treatment layer 308, the twenty-third treatment layer 308 containing activated carbon 310.

Below the twenty-third treatment layer 308 is a twenty-fourth treatment layer 312, the twenty-fourth treatment layer 312 containing a combination of mixed bed resin and activated carbon 314.

Below the twenty-fourth treatment layer 312 is a twenty-fifth layer 316, the twenty-fifth treatment layer 316 containing a combination of Redox Alloy and activated carbon 318.

Below the twenty-fifth treatment layer 316 is a twenty-sixth treatment layer 320, the twenty-sixth treatment layer 320 containing a combination of Redox Alloy and activated carbon followed by mixed bed resin 322.

Below the twenty-sixth treatment layer 320 is a twenty-seventh treatment layer 324, the twenty-seventh treatment layer 324 containing a combination of water softener and activated carbon 326.

Below the twenty-seventh layer 324 is a twenty-eighth treatment layer 328, the twenty-eighth treatment layer 328 containing a combination of Redox Alloy and activated carbon followed by water softener 330.

Below the twenty-eighth treatment layer 328 is a sixth filtering layer 332, the sixth filtering layer 332 containing filter paper 334. The sixth filtering layer completes the sixth treatment section.

Below the sixth treatment section, water then flows from the water purification apparatus through the downwardly extending spout 56 into the water collection tank 16 through the aperture 74 in the top 72 of the water collection tank 16. A user may then remove the water collection tank 16 from the water purification apparatus and utilize the water collection tank 16 as a pitcher for pouring water into an appropriate drinking apparatus such as a glass or a mug.

As noted hereinabove, the number of housing portions can be added or subtracted depending on the quality of the water to be treated.

Figure 10:
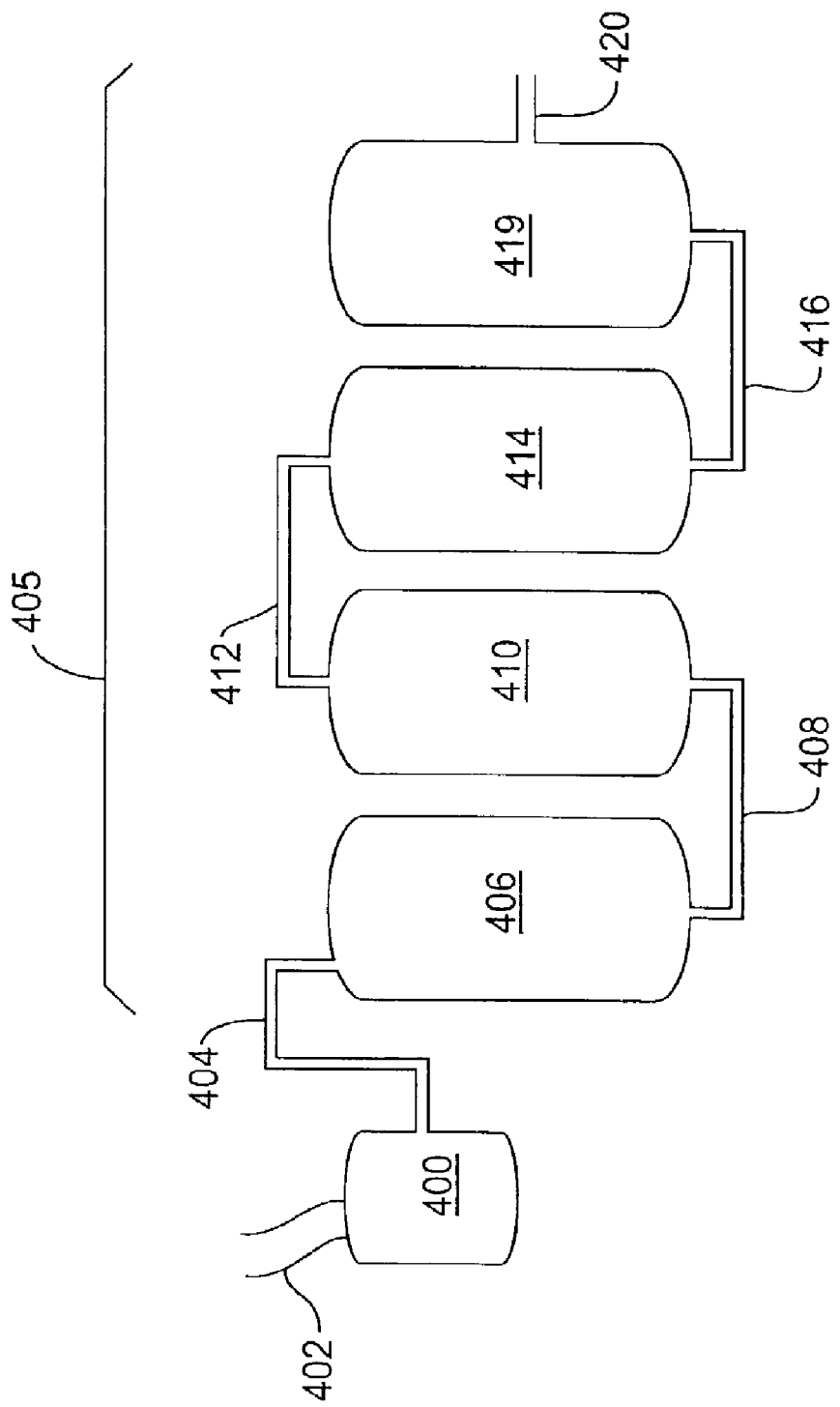
FIG. 10 is an environmental view of a second embodiment of a water treatment apparatus in accord with the present invention.

In a second embodiment hereof, and with reference to FIG. 10, a forcing means, such as a pump 400, a faucet containing filter paper 334. The sixth filtering layer completes the sixth treatment section.

Below the sixth treatment section, water then flows from the water purification apparatus through the downwardly extending spout 56 into the water collection tank 16 through the aperture 74 in the top 72 of the water collection tank 16. A user may then remove the water collection tank 16 from the water purification apparatus and utilize the water collection tank 16 as a pitcher for pouring water into an appropriate drinking apparatus such as a glass or a mug.

As noted hereinabove, the number of housing portions can be added or subtracted depending on the quality of the water to be treated.

In a second embodiment hereof, and with reference to FIG. 10, a forcing means, such as a pump 400, a faucet attachment with a flow regulator (not shown), or the like is deployed to force water through a Treatment housing 405. Water is fed into the forcing means from a collector 402 which collects water from any suitable source (not shown). Suitable sources include, for example, and as contemplated herein, a condenser of an air conditioner, a vehicle radiator, etc. In this manner, portable water may be obtained during, for instance, an automobile trip in which the automobile's air conditioner is used.

The forcing means forces water from the water source (not shown) through the treatment housing 405, where treatment occurs via separate treatment sections, each treatment section comprising distinct particulate layers as described hereinabove. In this embodiment, as gravity is not used to feed water through the apparatus, the portions of the housing 405 need not be vertically stacked as in the first and second embodiments, but may be configured in any suitable way. Preferably, the housing 405 comprises a plurality of housing sections 406, 410, 414, 418 connected to each other via fluid delivery conduits or hoses 404, 408, 412, 416, respectively, with treated water exiting the treatment housing 405 via an outlet hose or pipe 420.

Adding a forcing means to the first embodiment is also envisioned. This would allow the housing sections of the first embodiment to be connected in configurations other than vertical stacking.

As will be realized, the invention is capable of other and different embodiments and its several details are capable of modifications in various obvious respects, all without departing from the invention.

What is claimed is:

1. A fluid treatment apparatus, comprising:
 a housing including an inlet, an outlet, and layers of filtration material, the layers of filtration material layers, comprising:
   (a) an activated carbon layer for removing chlorine and organic contaminants in the fluid;
   (b) a redox alloy layer for neutralizing pH or for microbiological treatment in the fluid; and
   (c) one or more ion exchange resins in a layer for removing inorganic and radiological contaminants in the fluid, wherein the fluid is fed into the apparatus by a condensation source, and the condensation source is one of an air conditioner, a dehumidifier, and a radiator.

2. A water treatment apparatus adapted to remove at least one of organic, inorganic, and radiological contaminants from untreated liquid water to produce potable water suitable for human consumption, the apparatus comprising:
 a housing having an inlet for receiving untreated liquid water, an outlet for discharging liquid potable water, and a means for lengthening dwell time positioned near or as part of the outlet of the housing;
 a plurality of particulate treatment layers positioned within the housing and having substantially the same cross-sectional area as the housing, including:
   (a) a first activated carbon layer for removing chlorine and organic contaminants in the untreated liquid water;
   (b) a redox alloy layer for neutralizing pH or for microbiological treatment in the water;
   (c) a second activated carbon layer for removing residual chlorine and organic contaminants in the water; and
   (d) one or more ion exchange resins in a layer for removing inorganic and radiological contaminants in the water; and
 at least one separator member positioned within the housing and adjacent to at least one of the particulate treatment layers, the at least one separator member being adapted to control the flow of water through the housing, wherein the untreated water enters the apparatus through the inlet, passes through each particulate treatment layer in sequential order, and is discharged through the outlet, thereby producing potable water suitable for human consumption.

3. The water treatment apparatus of claim 2, wherein the first activated carbon layer, the redox alloy layer, and the second activated carbon layer are combined into a single layer.

4. The water treatment apparatus of claim 2, wherein at least one of the activated carbon layers comprises carbon in the form of at least one of granular carbon, a carbon block, carbon infused within filter cloth or filter paper, and carbon impregnated with silver.

5. The water treatment apparatus of claim 2, wherein the outlet controls the flow rate of the fluid through the apparatus resulting in a dwell time of about 1 to 10 minutes.

6. The water treatment apparatus of claim 2, wherein the apparatus has a dwell time sufficient for contacting water with the layers of filtration materials to produce potable water.

7. The water treatment apparatus of claim 2, further comprising a resin layer for microbiological treatment.

8. The water treatment apparatus of claim 7, further comprising a means for increasing the dwell time of the fluid in the resin layer for microbiological treatment.

9. The water treatment apparatus of claim 7, wherein the resin layer for microbiological treatment is positioned above the first activated carbon layer.

10. The water treatment apparatus of claim 9, further comprising a further activated carbon layer above the resin layer for microbiological treatment.

11. The water treatment apparatus of claim 2, wherein the untreated liquid water is fed into the apparatus by a condensation source.

12. The water treatment apparatus of claim 11, wherein the condensation source is one of an air conditioner, a dehumidifier, and a radiator.

13. The water treatment apparatus of claim 2, wherein the untreated liquid water is fed into the apparatus by gravity.

14. The water treatment apparatus of claim 2, wherein the untreated liquid water is fed into the apparatus by pressure.

15. A method for treating untreated liquid water to remove at least one of organic, inorganic, and radiological contaminants from untreated liquid water to produce liquid potable water suitable for human consumption, the method comprising the steps:
(a) passing untreated liquid water through a water treatment apparatus adapted to remove at least one of organic, inorganic, and radiological contaminants from untreated liquid water to produce potable water suitable for human consumption, the apparatus comprising:
a housing having an inlet for receiving untreated liquid water, an outlet for discharging liquid potable water, and a means for lengthening dwell time positioned near or as part of the outlet of the housing;
a plurality of distinct particulate treatment layers positioned within the housing and having substantially the same cross-sectional area as the housing, including:
(a) a first activated carbon layer for removing chlorine and organic contaminants in the untreated liquid water;
(b) a redox alloy layer for neutralizing pH or for microbiological treatment in the water;
(c) a second activated carbon layer for removing residual chlorine and organic contaminants in the water; and
(d) one or more ion exchange resins in a layer for removing inorganic and radiological contaminants in the water; and
at least one separator member positioned within the housing and adjacent to at least one of the particulate treatment layers, the at least one separator member being adapted to control the flow of water through the housing,
wherein the untreated water enters the apparatus through the inlet, passes through each particulate treatment layer in sequential order, and is discharged through the outlet, thereby producing potable water suitable for human consumption; and
(b) collecting the potable water that is discharged through the outlet.

16. The method for treating untreated liquid water of claim 15, wherein the first activated carbon layer, the redox alloy layer, and the second activated carbon layer are combined into a single layer.

17. The method for treating untreated liquid water of claim 15, wherein at least one of the activated carbon layers comprises carbon in the form of at least one of granular carbon, a carbon block, carbon infused within filter cloth or filter paper, and carbon impregnated with silver.

18. The method for treating untreated liquid water of claim 15, wherein the outlet controls the flow rate of the fluid through the apparatus resulting in a dwell time of about 1 to 10 minutes.

19. The method for treating untreated liquid water of claim 15, wherein the apparatus has a dwell time sufficient for contacting water with the layers of filtration materials to produce potable water.

20. The method for treating untreated liquid water of claim 15, wherein the water treatment apparatus further comprises a resin layer for microbiological treatment.

21. The method for treating untreated liquid water of claim 20, further comprising a means for increasing the dwell time of the fluid in the resin layer for microbiological treatment.

22. The method for treating untreated liquid water of claim 20, wherein the resin layer for microbiological treatment is positioned above the first activated carbon layer.

23. The method for treating untreated liquid water of claim 22, wherein the water treatment apparatus further comprises a further activated carbon layer above the resin layer for microbiological treatment.

24. The method for treating untreated liquid water of claim 15, wherein the untreated liquid water is fed into the apparatus by a condensation source.

25. The method for treating untreated liquid water of claim 24, wherein the condensation source is one of an air conditioner, a dehumidifier, and a radiator.

26. The method for treating untreated liquid water of claim 15, wherein the untreated liquid water is fed into the apparatus by gravity.

27. The method for treating untreated liquid water of claim 15, wherein the untreated liquid water is fed into the apparatus by pressure.

* * * * *